US012712707B2

(12) United States Patent
Li

(10) Patent No.: US 12,712,707 B2
(45) Date of Patent: Aug. 18, 2026

(54) STORING AND SEARCHING SENSITIVE DATA USING EMBEDDINGS

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 58 days.

(21) Appl. No.: 18/954,246

(22) Filed: Nov. 20, 2024

(65) Prior Publication Data

US 2026/0142796 A1 May 21, 2026

(51) Int. Cl.
*H04L 9/08* (2006.01)
*G06F 16/334* (2025.01)
*H04L 9/06* (2006.01)

(52) U.S. Cl.
CPC ........ *H04L 9/0618* (2013.01); *G06F 16/3347* (2019.01)

(58) Field of Classification Search
USPC ........................................................... 380/37
See application file for complete search history.

(56) References Cited

U.S. PATENT DOCUMENTS

| | | | | |
|---|---|---|---|---|
| 2025/0021551 | A1* | 1/2025 | Kim | G06F 13/382 |
| 2025/0258863 | A1* | 8/2025 | Penrose | G06F 16/7844 |
| 2025/0307321 | A1* | 10/2025 | Ferrucci | G06N 5/022 |
| 2025/0373428 | A1* | 12/2025 | Wang | H04L 9/3213 |
| 2025/0384118 | A1* | 12/2025 | Pollard | G06F 21/32 |

* cited by examiner

*Primary Examiner* — Sanchit K Sarker
(74) *Attorney, Agent, or Firm* — SCHWEGMAN LUNDBERG & WOESSNER, P.A.

(57) ABSTRACT

In an example embodiment, embeddings are used to securely search sensitive encrypted data stored in a database without the need to retrieve and decrypt all data in a volume. Specifically, a piece of text is embedded into an embedding, which is then stored in a vector database. Then the piece of text can be encrypted and stored in another database. A linkage between the embedding and the ciphertext can also be stored. When a search is performed, one or more keywords from the search can be embedded and the keyword embedding can be compared to the embeddings in the vector database to locate similar embeddings. The ciphertexts corresponding to those similar embeddings can then be retrieved from the other database and decrypted. The decrypted ciphertexts can then be searched based on the keywords to find exact matches.

20 Claims, 5 Drawing Sheets

STORING AND SEARCHING SENSITIVE DATA USING EMBEDDINGS

TECHNICAL FIELD

This document generally relates to computer systems. More specifically, this document relates to use of embeddings for storing and searching sensitive data.

BACKGROUND

A large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
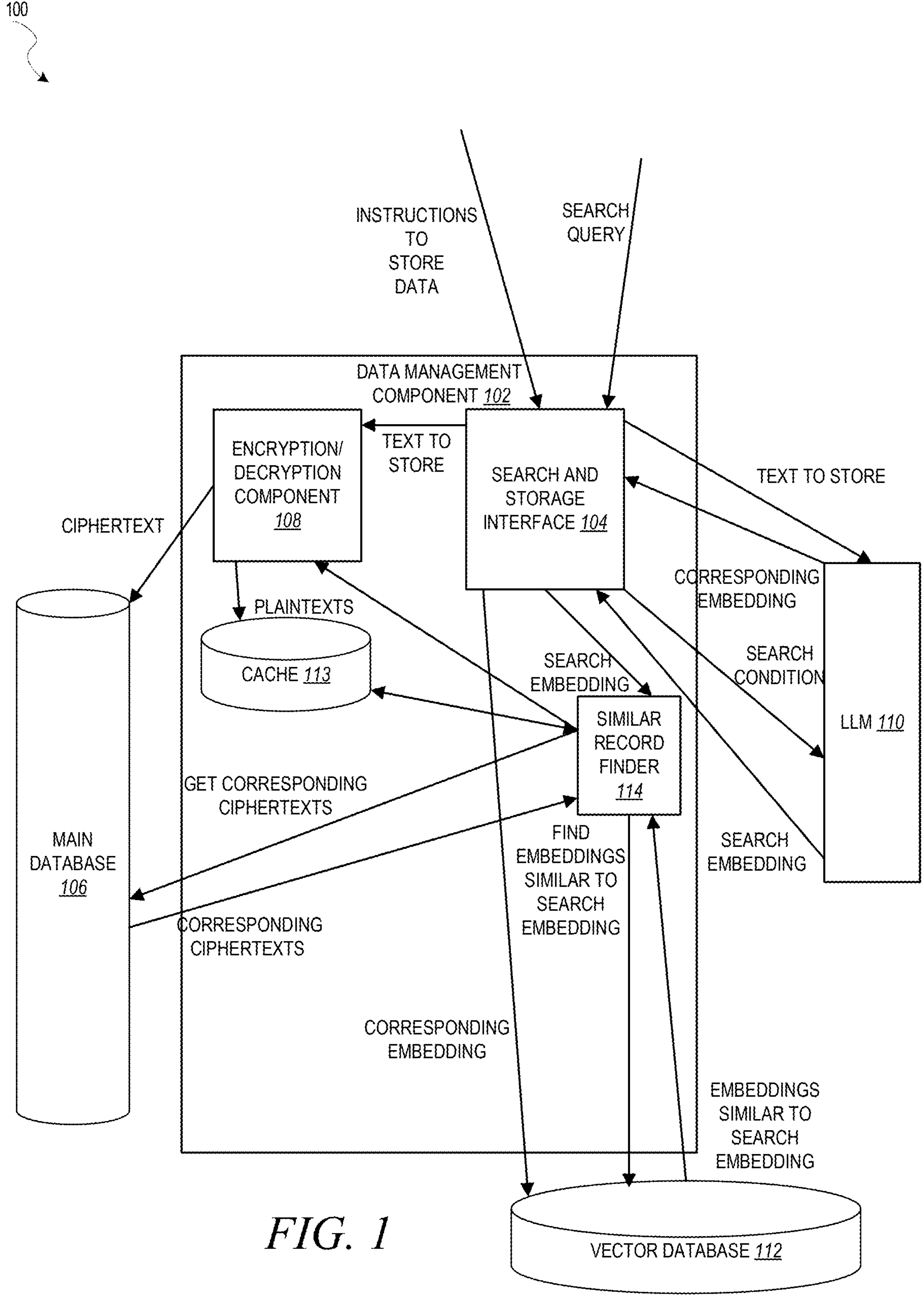
FIG. 1 is a block diagram illustrating a system for searching on encrypted data, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In recent times, more and more systems have moved to the cloud. This means that multiple users access the same database. Security, therefore, becomes very important to ensure that sensitive user data is not available to other users of the cloud or malicious users. Therefore, to prevent data leakage, data in the database may be encrypted into ciphertext, and the ciphertext is stored in the database. When the data is to be read out, the ciphertext is retrieved from the database, and decrypted back into plaintext.

Storing ciphertext, however, does not support search. If there are many encrypted records stored, and a user is attempting to search for some but not all of them, such as only ones containing particular keywords, then the ciphertexts cannot be searched directly for those keywords. Rather, all of the records need to be retrieved, or even downloaded to the client-side, and decrypted before they can be searched. This is quite wasteful of memory and processor resources and also can be quite slow. Indeed, if the data is too voluminous, then it may even be impossible to decrypt and search all ciphertexts in memory, due to memory size limitations or the amount of time needed for decryption exceeding any reasonable amount of time (e.g., years).

In an example embodiment, embeddings are used to securely search sensitive encrypted data stored in a database without the need to retrieve and decrypt all data in a volume. Specifically, a piece of text is embedded into an embedding, which is then stored in a vector database. Then the piece of text can be encrypted and stored in another database. A linkage between the embedding and the ciphertext can also be stored. When a search is performed, one or more keywords from the search can be embedded and the keyword embedding can be compared to the embeddings in the vector database to locate similar embeddings. Then the ciphertexts corresponding to those similar embeddings can be retrieved from the other database and decrypted. The decrypted ciphertexts can then be searched based on the keywords to find exact matches.

An embedding is a set of coordinates in a latent n-dimensional space such that the proximity (e.g., cosine distance) of the coordinates to other coordinates is indicative of the similarity of the information embedded to those coordinates. In an example embodiment, the embedding is a high-dimensional (e.g., 1536-dimension) floating point vector and the texts with similar semantics will have the corresponding similar embeddings.

An example of an N-dimension embeddings is as follows.

$$v = [0.001, 0.0015, -0.0030, \ldots \ldots, 0.02](N \text{ element in the vector})$$

Prior to a piece of text being encrypted into ciphertext, the piece of text may be embedded into an embedding. This may be performed by passing the piece of text through an embedding machine learning model. The embedding machine learning model may be a model specifically trained to produce embeddings for text, or alternatively may be part of a model trained to produce something other than embeddings but that produces embeddings as part of its process in producing that other something.

The embedding machine learning model may be trained by any model from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the embedding machine learning algorithm used to train the machine learning model may iterate among various weights (which are the parameters) that will be multiplied by various input variables and evaluate a loss function at each iteration until the loss function is minimized, at which stage the weights/parameters for that stage are learned. Specifically, the weights are multiplied by the input variables as part of a weighted sum operation, and the weighted sum operation is used by the loss function.

In some example embodiments, the training of the embedding machine learning model may take place as a dedicated training phase. In other example embodiments, the embedding machine learning model may be retrained dynamically at runtime based on feedback.

In an example embodiment, the embedding machine learning model is part of a Large Language Model (LLM). LLMs provide for natural language processing (NPL) of text and rely on embeddings as part of its processing.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well or not the generated samples fooled the discriminator.

In another example embodiment, the GAI model is a Variational AutoEncoders (VAEs) model. VAEs comprise an encoder network that compresses the input data into a lower-dimensional representation called a latent code, and a decoder network that generates new data from the latent code. In either case, the GAI model contains a generative classifier which can be implemented as, for example, a naïve Bayes classifier.

The present solution works with any type of GAI model, although an implementation that specifically is used with a GPT model will be described.

When a GAI model generates new, original data, it goes through the process of evaluating and classifying the data input to it. The product of this evaluation and classification is utilized to generate embeddings for data, which can then be later used to actually generate new data by the GAI model. In an example embodiment, however, the new original data is either not generated or is irrelevant to the present solution. Rather, an embedding for the input piece of text is generated based on the intermediate work product of the GAI model that it would produce when going through the motions of generating the new original data.

The result of an embedding process performed on a piece of data is an embedding, which is a vector. The vector may then be stored in a vector database. The following is an example of embeddings stored in a vector database, in accordance with an example embodiment:

| RECORD_ID | FIELD | VECTOR |
|---|---|---|
| 1 | FIELD1 | <embeddings of FIELD1 of record 1> |
| 1 | FIELD2 | <embeddings of FIELD2 of record 1> |
| 1 | FIELD3 | <embeddings of FIELD3 of record 1> |
| ... | ... | ... |
| 2 | FIELD1 | <embeddings of FIELD1 of record 2> |
| 2 | FIELD2 | <embeddings of FIELD2 of record 2> |
| 2 | FIELD3 | <embeddings of FIELD3 of record 2> |
| ... | ... | ... |

It is very difficult for a malicious user to deduce the plaintext from the embeddings, and thus even if an unauthorized user were somehow able to gain access to the embeddings, the security of the underlying ciphertext remains safe. It is conceivably possible for the plaintext to be deduced using high-resource brute force, but for most purposes this would not be feasible and is not a concern unless the security requirements for the data are extremely stringent.

When a search is performed, it will generally be a request to fetch some records based on some condition (such as FIELD1 containing "abcd") from the main database (the database that stores the ciphertext data as opposed to the vector database). The search condition (e.g., ABCD) can then itself be turned into an embedding using the embedding machine learning model such as the LLM. This embedding may be called the search embedding.

Then, embeddings in the vector database that are similar to the search embedding may be located. In an example embodiment, this may be performed by calculating the cosine correlation coefficient between the search embedding $v_s$ and the embeddings $v_r$ of field FIELD1 of every record by the following formula.

$$c_{s,r} = \frac{\sum_{n=1}^{N}(v_{s,n} \cdot v_{r,n})}{\sqrt{\sum_{n=1}^{N}(v_{s,n})^2} \cdot \sqrt{\sum_{n=1}^{N}(v_{r,n})^2}}$$

Where N is the dimension of the embeddings, $v_{s,n}$ is the n-th element $v_s$, and $v_{r,n}$ is the n-th element of $v_r$.

What counts as "similar" may be defined based on a preset threshold $C_{th}$, and thus record IDs whose $C_{s,r}$ are greater than a threshold $C_{th}$ are selected as "similar" embeddings. Then the ciphertexts, corresponding to the similar embeddings, may be retrieved from the main database and decrypted. In this way, only the ciphertexts that have similar embeddings (and thus are "similar" to the search keyword (s)) need to be decrypted. While it is not guaranteed that these ciphertexts will contain an actual match, by eliminating dissimilar ciphertexts there are tremendous memory and processing savings realized.

The decrypted ciphertexts can then be searched for exact matches to the search keyword(s).

Complex searches may also be implemented using this solution. A complex search is one that includes more than one condition, such as FIELD1 contains keyword "abcd" AND FIELD2 contains keyword "1234". In such a case, the individual conditions may be evaluated using the above techniques to obtain the similar embeddings, and the groups of similar embeddings can then be combined using the operators of the search. For example, if the search specifies an AND condition like the example above, the groups of similar embeddings can be intersected to determine the collection of embeddings to be decrypted.

Thus, in the above example, embeddings similar to the embedding of the keyword "abcd" are determined. This may be marked as collection 1. Then embeddings similar to the embedding of the keyword "1234" are determined. These may be marked as collection 2. The intersection of collection 1 and collection 2 is then determined, which may be marked as collection 3. Then the ciphertexts corresponding to the embeddings in collection 2 may be retrieved from the main database and decrypted into plain text, and an exact match search of FIELD1 containing keyword "abcd" AND FIELD2 containing keyword "1234" for the plaintext of fields FIELD1 and FIELD2 of collection 3 are found.

FIG. 1 is a block diagram illustrating a system 100 for searching on encrypted data, in accordance with an example embodiment. A data management component 102 may contain a search and storage interface 104. The search and storage interface 104 receives instructions to store data in a main database 106 and/or locate matching records in the main database 106. In an example embodiment, the main database 106 is a relational database. In a further example embodiment, the relational database is an in-memory database. One example of an in-memory database is HANA™, from SAP SE of Walldorf, Germany. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access.

If the instructions are to store data in the main database 106, the instructions may include one or more pieces of text, or at least identifications of one or more pieces of data, to be stored. For each piece of text, two tasks are performed. These tasks may be performed sequentially (in any order) or in parallel. First, a data encryption/decryption component 108 is used to encrypt the piece of text into a corresponding ciphertext. The corresponding ciphertext may then be stored in the main database 106. Second, the piece of text is sent to an embedding machine learning model, such as LLM 110, to obtain an embedding for the piece of text. The embedding is then stored in a vector database 112. In an example embodiment, the vector database 112 is not a relational database.

In a further example embodiment, a linkage between the embedding and the corresponding ciphertext is stored in the vector database 112 to allow for easy retrieval of the corresponding ciphertext if the embedding is deemed to be similar to a search embedding later.

If the instructions are to perform a search for matching data in the main database 106, each search condition in the search is transformed to a search embedding by passing at least a portion of the search condition (typically the portion that is trying to be matched in the condition) to the embedding machine learning model, such as the LLM 110. This obtains a search embedding for the search condition. A similar record finder 114 then compares the search embedding to the embeddings in the vector database 112 to locate a group of similar embeddings. As mentioned above, this may be accomplished using cosine correlation coefficients and a threshold. Once this group of similar embeddings is determined, then a ciphertext corresponding to each embedding in the group of similar embeddings is retrieved from the main database 106 and sent to the encryption/decryption component 108 for decryption into plaintext. These corresponding plaintexts may then be stored in a cache 113, where they can be searched against the text of the condition. Any matching plaintexts can then be returned.

While two distinct databases, specifically main database 106 and vector database 112 are depicted here, in some example embodiments the ciphertexts and the embeddings may be stored in the same database.

Additionally, the linkage between an embedding and a corresponding ciphertext can either be stored in the vector database 112 or the main database 106 or both.

Figure 2:
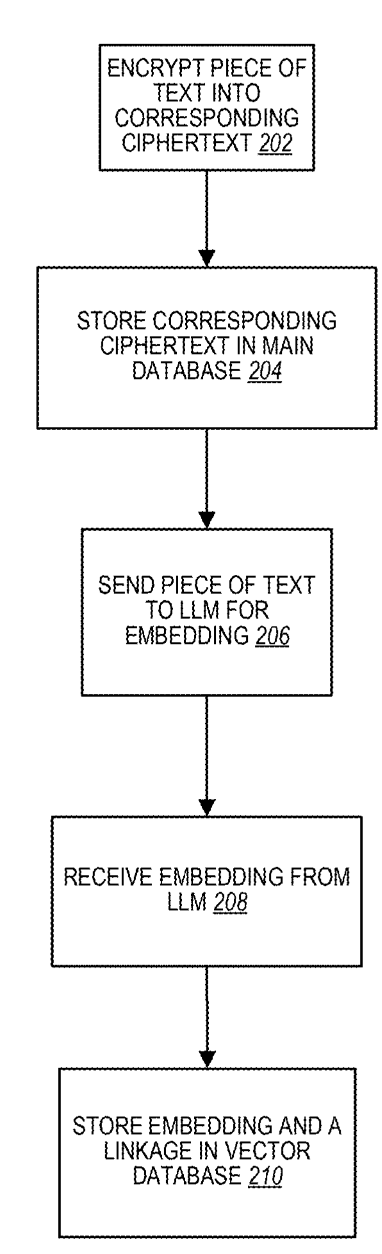
FIG. 2 is a flow diagram illustrating a method for storing a piece of text in a main database, in accordance with an example embodiment.

FIG. 2 is a flow diagram illustrating a method 200 for storing a piece of text in a main database, in accordance with an example embodiment. At operation 202, the piece of text may be encrypted into a corresponding ciphertext. At operation 204, the corresponding ciphertext is stored in the main database. At operation 206, the piece of text (in unencrypted form) is sent to an LLM for embedding. At operation 208, a corresponding embedding is received from the LLM. At operation 210, the corresponding embedding and a linkage between the corresponding embedding and the corresponding ciphertext are stored in a vector database.

Figure 3:
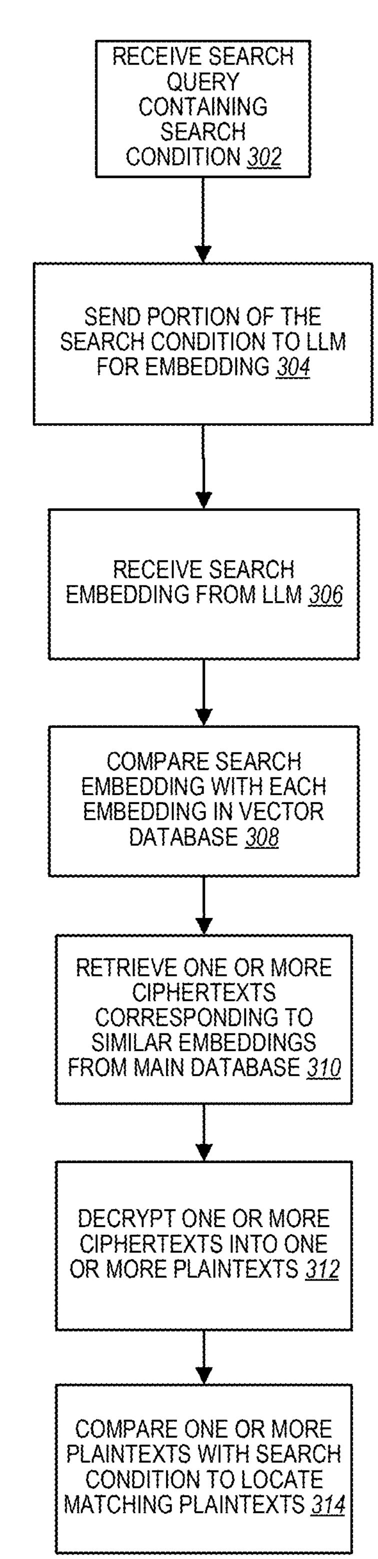
FIG. 3 is a flow diagram illustrating a method for performing a search on text in a main database, in accordance with an example embodiment.

FIG. 3 is a flow diagram illustrating a method 300 for performing a search on text in a main database. The text in the main database is encrypted, and thus cannot be directly searched. At operation 302, a search query containing a search condition is received. At operation 304, a portion of the search condition is sent to an LLM for embedding. At operation 306, a search embedding is received from the LLM.

At operation 308, the search embedding is compared to a plurality of embeddings in a vector database to locate a group of embeddings similar to the search embedding. As described above, this may include calculating the cosine correlation coefficient between the search embedding and each embedding in the vector database and comparing that cosine correlation coefficient to a predetermined threshold. Any embedding in the vector database whose cosine correlation coefficient with the search embedding exceeds the threshold are considered to be part of the group of embeddings similar to the search embedding.

At operation 310, one or more ciphertexts stored in the main database corresponding to one or more embeddings in the group of embeddings similar to the search embedding are retrieved. At operation 312, the retrieved one or more ciphertexts are decrypted into one or more plaintexts. At operation 314, the one or more plaintexts are compared with the search condition to find one or more matching plaintexts.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: receiving a search query containing a first search condition; passing the first search condition through an embedding machine learning model to create a search embedding, the search embedding being a vector of coordinates in a latent n-dimensional space; locating, in a vector database, one or more embeddings similar to the search embedding; grouping the one or more embeddings into a collection; identifying one or more ciphertexts corresponding to the collection, in a main database; decrypting the one or more ciphertexts into one or more plaintexts; and performing a search of the first search condition on the one or more plaintexts to locate one or more matching plaintexts.

In Example 2, the subject matter of Example 1 comprises, wherein the locating comprises, for each embedding in the vector database, calculating a cosine correlation coefficient between the search embedding and the embedding and comparing the cosine correlation coefficient to a predetermined threshold.

In Example 3, the subject matter of Examples 1-2 comprises, wherein the embedding machine learning model is Large Language Model (LLM).

In Example 4, the subject matter of Examples 1-3 comprises, wherein the main database is a relational database.

In Example 5, the subject matter of Example 4 comprises, wherein the main database is an in-memory database.

In Example 6, the subject matter of Examples 4-5 comprises, wherein the vector database is a non-relational database.

In Example 7, the subject matter of Examples 1-6 comprises, wherein the operations further comprise: receiving a request to store a first piece of text in the main database; encrypting the first piece of text into a first corresponding ciphertext; storing the first corresponding ciphertext in the main database; passing the first piece of text into the embedding machine learning model to create a first corresponding embedding; generating a linkage between the first corresponding embedding and the first corresponding ciphertext; and storing the first corresponding embedding and the linkage in the vector database.

In Example 8, the subject matter of Examples 1-7 comprises, wherein the search query further contains a second search condition separate from the first search condition by an operator, and wherein the operations further comprise: passing second first search condition through the embedding machine learning model to create a second search embedding; locating, in a vector database, one or more embeddings similar to the second search embedding; modifying the collection based on the one or more embeddings similar to the second search embedding and the operator.

In Example 9, the subject matter of Example 8 comprises, wherein the operator is an AND operator and the modifying comprises forming the collection using an intersection of the one or more embeddings similar to the search embedding and the one or more embeddings similar to the second search embedding.

In Example 10, the subject matter of Examples 8-9 comprises, wherein the operator is an OR operator and the modifying comprises forming the collection using a union of the one or more embeddings similar to the search embedding and the one or more embeddings similar to the second search embedding.

Example 11 is a method comprising: receiving a search query containing a first search condition; passing the first search condition through an embedding machine learning model to create a search embedding, the search embedding being a vector of coordinates in a latent n-dimensional space; locating, in a vector database, one or more embeddings similar to the search embedding; grouping the one or more embeddings into a collection; identifying one or more ciphertexts corresponding to the collection, in a main database; decrypting the one or more ciphertexts into one or more plaintexts; and performing a search of the first search condition on the one or more plaintexts to locate one or more matching plaintexts.

In Example 12, the subject matter of Example 11 comprises, wherein the locating comprises, for each embedding in the vector database, calculating a cosine correlation coefficient between the search embedding and the embedding and comparing the cosine correlation coefficient to a predetermined threshold.

In Example 13, the subject matter of Examples 11-12 comprises, wherein the embedding machine learning model is Large Language Model (LLM).

In Example 14, the subject matter of Examples 11-13 comprises, wherein the main database is a relational database.

In Example 15, the subject matter of Example 14 comprises, wherein the main database is an in-memory database.

In Example 16, the subject matter of Examples 14-15 comprises, wherein the vector database is a non-relational database.

In Example 17, the subject matter of Examples 11-16 comprises, receiving a request to store a first piece of text in the main database; encrypting the first piece of text into a first corresponding ciphertext; storing the first corresponding ciphertext in the main database; passing the first piece of text into the embedding machine learning model to create a first corresponding embedding; generating a linkage between the first corresponding embedding and the first corresponding ciphertext; and storing the first corresponding embedding and the linkage in the vector database.

In Example 18, the subject matter of Examples 11-17 comprises, wherein the search query further contains a second search condition separate from the first search condition by an operator, and wherein the method further comprises: passing second first search condition through the embedding machine learning model to create a second search embedding; locating, in a vector database, one or more embeddings similar to the second search embedding; modifying the collection based on the one or more embeddings similar to the second search embedding and the operator.

In Example 19, the subject matter of Example 18 comprises, wherein the operator is an AND operator and the modifying comprises forming the collection using an intersection of the one or more embeddings similar to the search embedding and the one or more embeddings similar to the second search embedding.

Example 20 is a non-transitory machine-readable medium storing instructions which, when executed by one or more processors, cause the one or more processors to perform operations comprising: receiving a search query containing a first search condition; passing the first search condition through an embedding machine learning model to create a search embedding, the search embedding being a vector of coordinates in a latent n-dimensional space; locating, in a vector database, one or more embeddings similar to the search embedding; grouping the one or more embeddings into a collection; identifying one or more ciphertexts corresponding to the collection, in a main database; decrypting the one or more ciphertexts into one or more plaintexts; and performing a search of the first search condition on the one or more plaintexts to locate one or more matching plaintexts.

Example 21 is at least one machine-readable medium comprising instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 4:
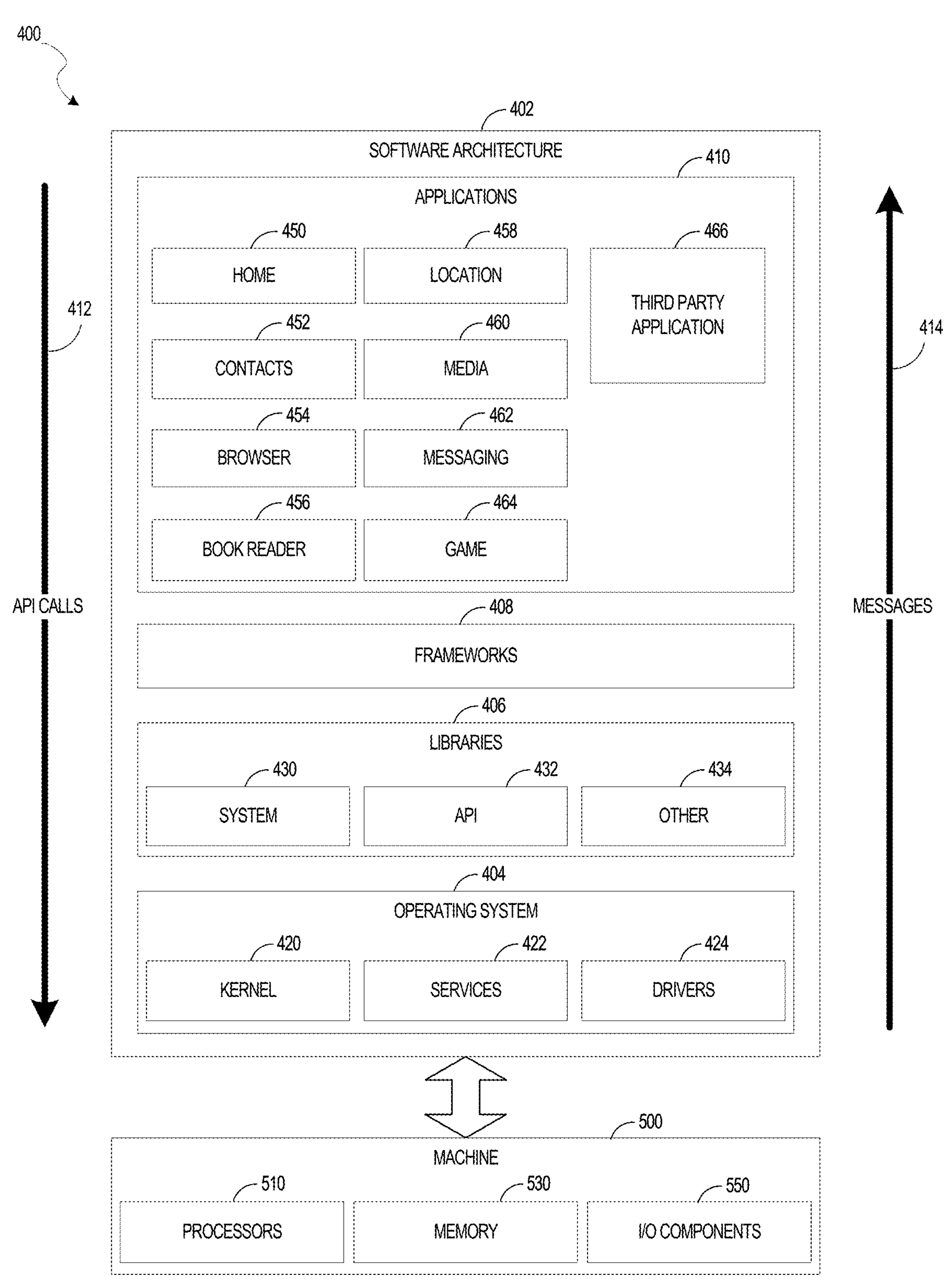
FIG. 4 is a block diagram illustrating an architecture of software.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
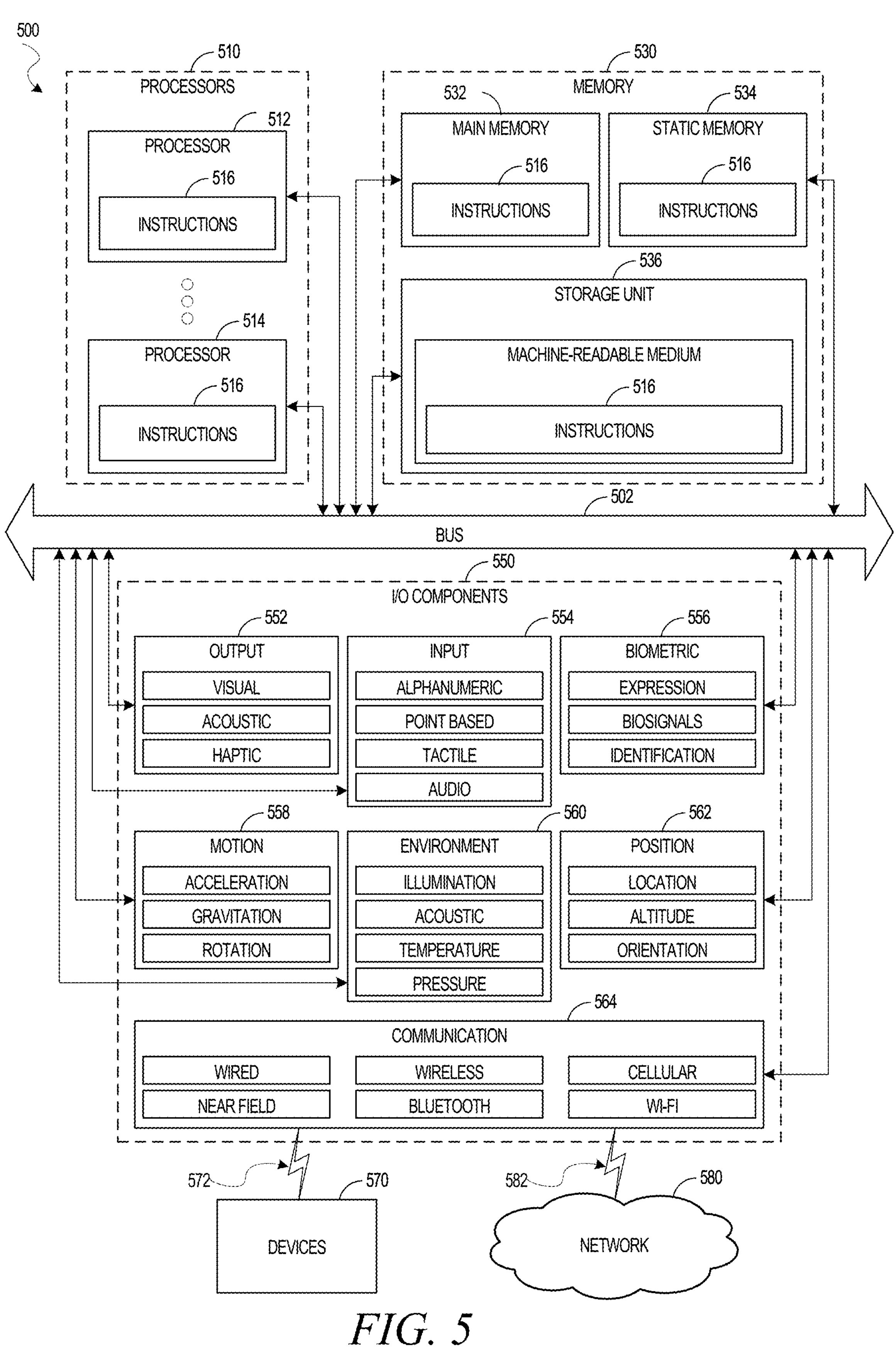
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms “machine-storage medium,” “device-storage medium,” and “computer-storage medium” mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms “machine-storage media,” “computer-storage media,” and “device-storage media” specifically exclude carrier waves, modulated data signals, and other such media, at least some of which are covered under the term “signal medium” discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms “transmission medium” and “signal medium” mean the same thing and may be used interchangeably in this disclosure. The terms “transmission medium” and “signal medium” shall be taken to include any intangible medium that is capable of storing, encoding, or carrying the instructions 516 for execution by the machine 500, and include digital or analog communications signals or other intangible media to facilitate communication of such software. Hence, the terms “transmission medium” and “signal medium” shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

receiving a search query containing a first search condition;

passing the first search condition through an embedding machine learning model to create a search embedding, the search embedding being a vector of coordinates in a latent n-dimensional space;

locating, in a vector database storing a plurality of embeddings, one or more embeddings similar to the search embedding, each embedding comprising a vector of coordinates in a latent n-dimensional space;

grouping the one or more embeddings into a collection;

identifying, in a main database that stores encrypted data as ciphertext, one or more ciphertexts corresponding to the collection, based on one or more stored linkages between the one or more embeddings and the one or more ciphertexts;

decrypting the one or more identified ciphertexts into one or more plaintexts;

performing a search of the first search condition on the one or more plaintexts to locate one or more matching plaintexts; and returning the one or more matching plaintexts in response to the search query.

2. The system of claim 1, wherein the locating comprises, for each embedding in the vector database, calculating a cosine correlation coefficient between the search embedding and the embedding and comparing the cosine correlation coefficient to a predetermined threshold.

3. The system of claim 1, wherein the embedding machine learning model is Large Language Model (LLM).

4. The system of claim 1, wherein the main database is a relational database.

5. The system of claim 4, wherein the main database is an in-memory database.

6. The system of claim 4, wherein the vector database is a non-relational database.

7. The system of claim 1, wherein the operations further comprise:

receiving a request to store a first piece of text in the main database;

encrypting the first piece of text into a first corresponding ciphertext;

storing the first corresponding ciphertext in the main database;

passing the first piece of text into the embedding machine learning model to create a first corresponding embedding;

generating a linkage between the first corresponding embedding and the first corresponding ciphertext; and storing the first corresponding embedding and the linkage in the vector database.

8. The system of claim 1, wherein the search query further contains a second search condition separate from the first search condition by an operator, and wherein the operations further comprise:

passing second first search condition through the embedding machine learning model to create a second search embedding;

locating, in a vector database, one or more embeddings similar to the second search embedding;

modifying the collection based on the one or more embeddings similar to the second search embedding and the operator.

9. The system of claim 8, wherein the operator is an AND operator and the modifying comprises forming the collection using an intersection of the one or more embeddings similar to the search embedding and the one or more embeddings similar to the second search embedding.

10. The system of claim 8, wherein the operator is an OR operator and the modifying comprises forming the collection using a union of the one or more embeddings similar to the search embedding and the one or more embeddings similar to the second search embedding.

11. A method comprising:

receiving a search query containing a first search condition;

passing the first search condition through an embedding machine learning model to create a search embedding, the search embedding being a vector of coordinates in a latent n-dimensional space;

locating, in a vector database storing a plurality of embeddings, one or more embeddings similar to the search embedding, each embedding comprising a vector of coordinates in a latent n-dimensional space;

grouping the one or more embeddings into a collection;

identifying, in a main database that stores encrypted data as ciphertext, one or more ciphertexts corresponding to the collection, based on one or more stored linkages between the one or more embeddings and the one or more ciphertexts;

decrypting the one or more identified ciphertexts into one or more plaintexts;

performing a search of the first search condition on the one or more plaintexts to locate one or more matching plaintexts; and returning the one or more matching plaintexts in response to the search query.

12. The method of claim 11, wherein the locating comprises, for each embedding in the vector database, calculating a cosine correlation coefficient between the search embedding and the embedding and comparing the cosine correlation coefficient to a predetermined threshold.

13. The method of claim 11, wherein the embedding machine learning model is Large Language Model (LLM).

14. The method of claim 11, wherein the main database is a relational database.

15. The method of claim 14, wherein the main database is an in-memory database.

16. The method of claim 14, wherein the vector database is a non-relational database.

17. The method of claim 11, further comprising:

receiving a request to store a first piece of text in the main database;

encrypting the first piece of text into a first corresponding ciphertext;

storing the first corresponding ciphertext in the main database;

passing the first piece of text into the embedding machine learning model to create a first corresponding embedding;

generating a linkage between the first corresponding embedding and the first corresponding ciphertext; and storing the first corresponding embedding and the linkage in the vector database.

18. The method of claim 11, wherein the search query further contains a second search condition separate from the first search condition by an operator, and wherein the method further comprises:

passing second first search condition through the embedding machine learning model to create a second search embedding;

locating, in a vector database, one or more embeddings similar to the second search embedding;

modifying the collection based on the one or more embeddings similar to the second search embedding and the operator.

19. The method of claim 18, wherein the operator is an AND operator and the modifying comprises forming the collection using an intersection of the one or more embeddings similar to the search embedding and the one or more embeddings similar to the second search embedding.

20. A non-transitory machine-readable medium storing instructions which, when executed by one or more processors, cause the one or more processors to perform operations comprising:

receiving a search query containing a first search condition;

passing the first search condition through an embedding machine learning model to create a search embedding, the search embedding being a vector of coordinates in a latent n-dimensional space;

locating, in a vector database storing a plurality of embeddings, one or more embeddings similar to the search embedding, each embedding comprising a vector of coordinates in a latent n-dimensional space;

grouping the one or more embeddings into a collection;

identifying, in a main database that stores encrypted data as ciphertext, one or more ciphertexts corresponding to the collection, based on one or more stored linkages between the one or more embeddings and the one or more ciphertexts;

decrypting the one or more identified ciphertexts into one or more plaintexts;

performing a search of the first search condition on the one or more plaintexts to locate one or more matching plaintexts; and returning the one or more matching plaintexts in response to the search query.

* * * * *